(12) United States Patent
Ghotgalkar (10) Patent No.: US 10,817,257 B2
(45) Date of Patent: Oct. 27, 2020

(54) DATA FLOW CONTROL FOR MULTI-CHIP SELECT

(71) Applicant: TEXAS INSTRUMENTS INCORPORATED, Dallas, TX (US)

(72) Inventor: Shailesh Ganapat Ghotgalkar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/390,780

(22) Filed: Apr. 22, 2019

(65) Prior Publication Data

US 2019/0310825 A1 Oct. 10, 2019

Related U.S. Application Data

(63) Continuation of application No. 15/148,325, filed on May 6, 2016, now Pat. No. 10,268,448.

(51) Int. Cl.
*G06F 5/14* (2006.01)
*G06F 3/06* (2006.01)
*G06F 5/06* (2006.01)

(52) U.S. Cl.
CPC .............. *G06F 5/14* (2013.01); *G06F 3/061* (2013.01); *G06F 3/0656* (2013.01); *G06F 3/0673* (2013.01); *G06F 5/065* (2013.01); *G06F 2205/067* (2013.01); *G06F 2205/126* (2013.01)

(58) Field of Classification Search
CPC ............. G06F 7/00; G06F 13/00; G06F 13/36
See application file for complete search history.

(56) References Cited

U.S. PATENT DOCUMENTS

| | | | | |
|---|---|---|---|---|
| 5,522,050 A | * | 5/1996 | Amini | G06F 13/28 710/315 |
| 5,862,206 A | * | 1/1999 | Thomas | H04Q 11/0478 370/395.4 |
| 6,112,229 A | * | 8/2000 | Hardy | G06F 21/85 709/206 |
| 6,167,499 A | * | 12/2000 | Letham | G11C 7/103 341/76 |
| 7,221,369 B1 | * | 5/2007 | Tripathi | G06F 13/4059 345/501 |
| 2009/0055569 A1 | * | 2/2009 | Maheshwari | G06F 13/4027 710/311 |
| 2009/0094397 A1 | | 4/2009 | Kariya | |
| 2011/0276730 A1 | | 11/2011 | Lin et al. | |

* cited by examiner

*Primary Examiner* — Getente A Yimer
(74) *Attorney, Agent, or Firm* — Brian D. Graham; Charles A. Brill; Frank D. Cimino (57) ABSTRACT

A system, method and computer readable medium for operating a First In, First Out (FIFO) buffer that transfers data between a host and a plurality of endpoints using chip select is disclosed. The method includes receiving a current value of a read pointer and a status for an active endpoint and reading data at a location to which the read pointer points and setting a tag associated with the location to which the read pointer points to indicate availability.

19 Claims, 8 Drawing Sheets

| | |
|---|---|
| CS1 | 406A |
| CS2 | 406B |
| CS2 | 406C |
| AVL | 406D |
| AVL | 406E |
| AVL | 406F |
| AVL | 406G |
| AVL | 406H |

| | |
|---|---|
| AVL | 406A |
| CS2 | 406B |
| CS2 | 406C |
| AVL | 406D |
| AVL | 406E |
| AVL | 406F |
| AVL | 406G |
| AVL | 406H |

| | |
|---|---|
| AVL | 406A |
| AVL | 406B |
| AVL | 406C |
| AVL | 406D |
| AVL | 406E |
| AVL | 406F |
| AVL | 406G |
| AVL | 406H |

DATA FLOW CONTROL FOR MULTI-CHIP SELECT

CROSS-REFERENCE TO RELATED APPLICATION

This application is a continuation of U.S. patent application Ser. No. 15/148,325 filed on May 6, 2016, which is hereby incorporated by reference for all purposes.

FIELD OF THE DISCLOSURE

Disclosed embodiments relate generally to the field of communication between a master and multiple slaves using chip-select. More particularly, and not by way of any limitation, the present disclosure is directed to data flow control for multi-chip-select.

BACKGROUND

Communication and memory peripherals can have hosts that communicate with multiple slaves or endpoints using chip-select. These peripherals have a common host port for a central processing unit (CPU) or direct memory access (DMA) controller and a common line interface for address and data, but data transfers happen between hosts (CPU/DMA) and multiple endpoints (slaves) through chip selects. One issue faced in this architecture is ensuring the data integrity of transfers for each endpoint while using a small area and simple user interfaces for the transfers.

In one prior art implementation, each endpoint has a dedicated First-In First-Out (FIFO) buffer or queue, but a common host/line interface. The host accesses the FIFOs through a common FIFO data register using multiplexor/demultiplexor logic.

In a second prior art implementation, a common buffer or FIFO is used for all endpoints, restricting the number of active transfers at a given time. Using dedicated FIFOs would require additional buffer area whereas using a common FIFO, the host must choose to A) track an ongoing transaction to completion before starting a transaction for a next endpoint, B) manage mechanisms to perform predefined sequence and fixed buffer utilization patterns across endpoints or C) build a sequencer to transfer controls across slaves to resume operations when the slave is next selected. Option A reduces the throughput, so that the slowest endpoint affects the operation of other endpoints, as well as host execution. Options B and C can involve complicated programming to run properly and are difficult to scale.

SUMMARY

Disclosed embodiments implement a common FIFO in each direction for all slave devices, also referred to herein as endpoints. That is, a transmission (TX) FIFO is used for all traffic moving from the host to the endpoints and a receiving (RX) FIFO is used for all traffic moving from the endpoints to the host. The FIFO buffer stores both data and a unique endpoint tag (CSx) for each endpoint, x. One tag value is reserved for "available" locations, with a location considered available when the location has been read or at reset. Each endpoint has independent read and write pointers, status flags, and may optionally have a threshold. Every FIFO operation matches the tag to determine a next location to be operated on.

The write operation is performed to the next available location with the restriction that to reach the next available location the write pointer shall not cross over the read pointer of the endpoint. After performing a write, the corresponding tag is updated with an appropriate endpoint designation, CSx. If no location is available without read pointer crossover, a status for endpoint CSx is marked as full. The status of the FIFO buffer is set to full when there are no available locations or all supported CSx are full.

The read operation is done from the next location having a corresponding CSx tag; once the read has been performed, the tag is updated to indicate availability. When all locations are available, the status of the FIFO buffer is set to empty. If no tag associated with CSx is present in the FIFO buffer, the status of CSx is set to empty. Each endpoint can optionally have a threshold value to trigger a FIFO read or write request to the host. The data flow mechanism is agnostic to the arbitration or data sequencing mechanism used on the line side.

In at least one embodiment the access register can be an address offset without a physical register underlying it; such that the read or write access to this offset translate directly to the FIFO access for corresponding endpoint as per the rules of operation described in this disclosure. Regardless of implementation whether register or register offset it is referred as access register henceforth.

In one aspect, an embodiment of a method of operating a First In, First Out FIFO buffer that transfers data between a host and a plurality of endpoints using chip select is disclosed. The method includes receiving a current value of a read pointer and a status for an active endpoint and reading data at a location to which the read pointer points and setting a tag associated with the location to which the read pointer points to indicate availability.

In another aspect, an embodiment of a system for performing communication between a host and a plurality of endpoints that are activated by chip select is disclosed. The system includes a common First In, First Out (FIFO) buffer for data transfer in a first direction, each entry in the FIFO buffer comprising a data location and a tag location, wherein a value of the tag location is operable to be set to either a designation of available or an identifier for a respective endpoint; and a plurality of registers associated with respective endpoints the registers comprising an access register for read or write triggering corresponding operation, a status and a read pointer.

In yet another aspect, an embodiment of a non-transitory computer-readable medium having a sequence of program instructions which, when executed by a processor, perform a method of operating a First In, First Out FIFO buffer that transfers data between a master device and a plurality of endpoints using chip select is disclosed. The method includes receiving a current value of a read pointer and a status for an active endpoint and reading data at a location to which the read pointer points and setting a tag associated with the location to which the read pointer points to indicate availability.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
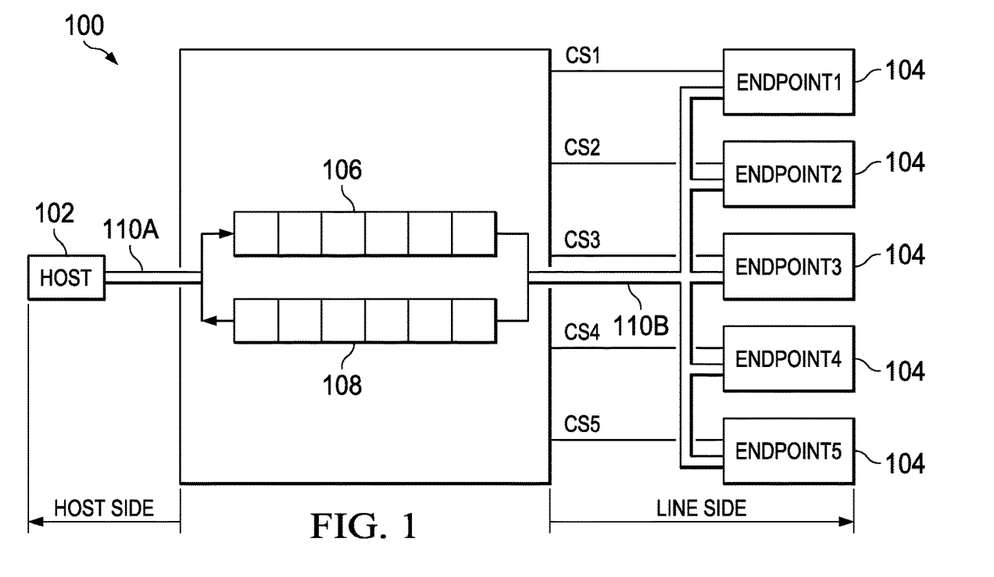
FIG. 1 depicts an example of a master/slave system in which an embodiment of the disclosure can be used.

FIG. 1 depicts an example master/slave system 100 that uses chip select to determine which slave is to be operated on. Host 102 communicates with a number of slave devices, herein referred to as Endpoints 104 using FIFO Buffers 106, 108. FIFO Buffer 106 is a transmission buffer in which Host 102 writes and Slave Devices 104 read and FIFO Buffer 108 is a reception buffer in which Endpoints 104 write and Host 102 reads. Actions occurring to the left in this figure are considered on the host side of FIFO Buffers 106, 108 and actions occurring to the right in this drawing are on the line side of FIFO Buffers 106, 108. Host 102 may be a Central Processing Unit (CPU) or a Direct Memory Access (DMA). Communication Channel 110A connects Host 102 to FIFO Buffers 106, 108 and Communication Channel 110B connects all of Endpoints 104 to FIFO Buffers 106, 108, i.e., Endpoints 104 share a common path to FIFO Buffers 106, 108. In at least one embodiment, Communication Channel 110 is a Serial Peripheral Interface (SPI) bus, although this is not a limitation. In at least one embodiment, Communication Channel 110 is configured to use other serial communication bus architectures that use chip select. When Host 102 initiates communication with one of Endpoints 104, Host 102 will assert a Chip Select (CS) signal for the selected endpoint and deselect all of the other endpoints. Although five endpoints are shown in this figure, it will be understood that this embodiment is solely for the sake of illustration and does not provide any limitation.

Figure 2A:
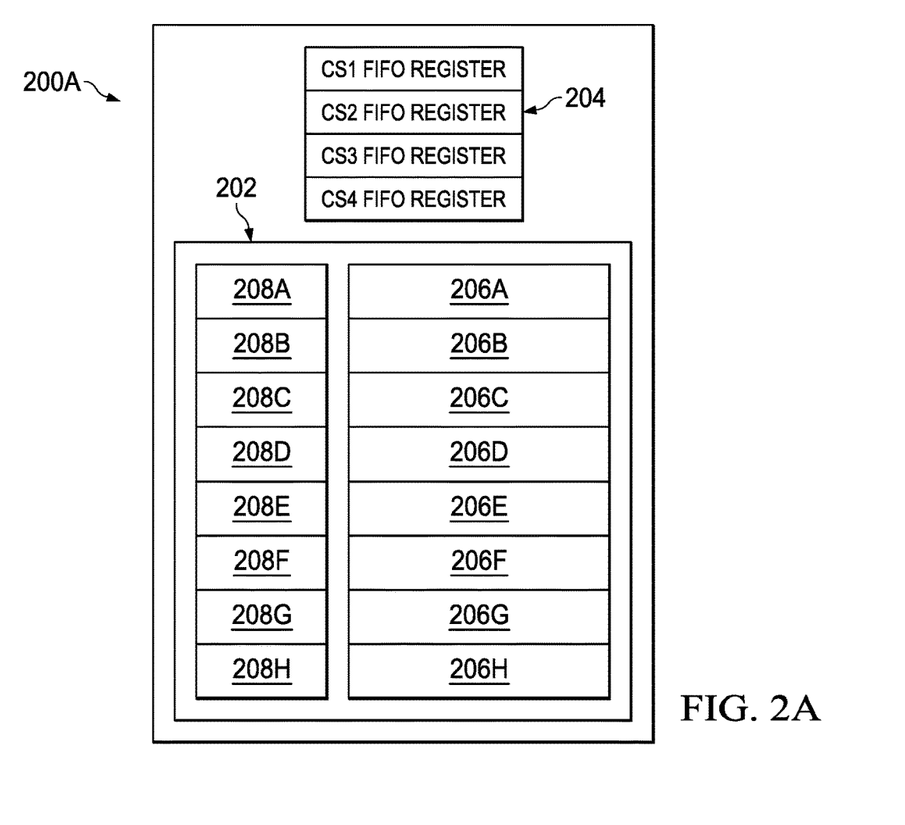
FIG. 2A depicts an example FIFO buffer and associated registers according to an embodiment of the disclosure.

FIG. 2A depicts an example FIFO Structure 200A, which contains FIFO Buffer 202 and Registers 204. In the example shown, FIFO Buffer 202 contains eight Data Locations 206 and eight Tag Locations 208, which are being shared by four Endpoints CS1, CS2, CS3, CS4.

As is known, a FIFO buffer acts as a circular buffer, with data being read and written in a single direction. With regard to the figures represented herein, it is assumed that the buffer is read or written from top to bottom; when the bottommost location is reached, the process then moves to the top of the buffer. Although data from different slaves may be interleaved in the buffer, the tags maintain the identity of the endpoint that has written or needs to read the data in each location. The restriction on writing to the buffer for a given endpoint is that the write pointer shall not cross over the read pointer in order to perform a write.

The data for multiple slaves can be interleaved within FIFO Buffer 202. In order to maintain the integrity of each endpoint's data, Registers 204 includes a register for each of Endpoints CS1, CS2, CS3, CS4. In at least one embodiment, Registers 204 each contain a FIFO Access register, Status Indicator, a Read Pointer and a Write Pointer for the respective endpoint. The read pointer and write pointer need not be user facing or be accessible to software, as these pointers are internal registers which are needed to accurately manage the endpoint access behavior to the FIFO buffer. The user facing registers are of three types:

A Status Indicator reflects the status of the endpoint, i.e., Empty/Full, which can be used by host software to decide next accesses;

A Data Access Register may be a single register that can be used for end-point data read/write. Data written to this register by the endpoint gets written to the TX FIFO and when a read access is targeted to this register, data is read from RX FIFO. Given that the TX FIFO is always Write and the RX FIFO is always Read for the host, only one register is sufficient, although in at least one embodiment, separate Data Access Registers are established for the TX FIFO and the RX FIFO; and An optional Threshold is provided in pairs, with separate registers for RX FIFO & TX FIFO, as data rates and response times can vary for both type of operations.

In at least one embodiment, Registers 204 also contain a Threshold that can be used to send an interrupt to the host when the threshold value is reached or crossed. In at least one embodiment, when Host 102 accesses a Register 204 for a selected endpoint, the access triggers FIFO operation for the corresponding endpoint.

Figure 2B:
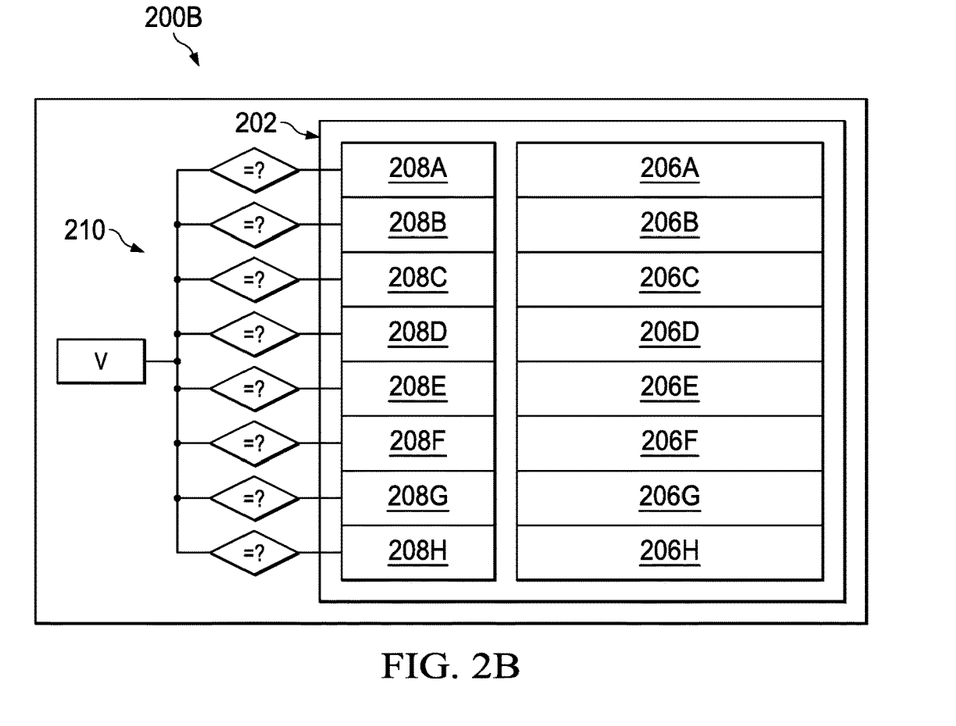
FIG. 2B depicts an example of a comparator used with the FIFO buffer to perform tag matching according to an embodiment of the disclosure.

FIG. 2B depicts another view of a FIFO Buffer Structure 200B, which includes FIFO Buffer 202 and Comparator 210. In the instance shown, Comparator 210 compares a value "V" to all of Tag Locations 208A-H and determines whether the locations match the compared value. Prior to writing to the buffer, Comparator 210 can be utilized to find locations in the buffer that are available, i.e., have a tag that designates availability. Prior to performing a read for an endpoint, Comparator 210 can also be utilized to determine locations that have a Tag 208 that matches a currently active endpoint.

The following figures illustrate example situations that will highlight the operation of the disclosed FIFO buffer. While it will be understood that the entity that is writing to the buffer and the entity that is reading from the buffer will differ depending on whether the buffer in question is the transmission buffer or the receiving buffer, the direction of flow does not affect the actions that will be performed. That is, whether the host is writing and the slave reading or whether the slave is writing and the host reading is irrelevant. Thus, when we speak of data and tags being written to the buffer or read from the buffer, the entity performing the actions can be either the host or a slave, depending on the direction the information is moving.

Figure 3A:
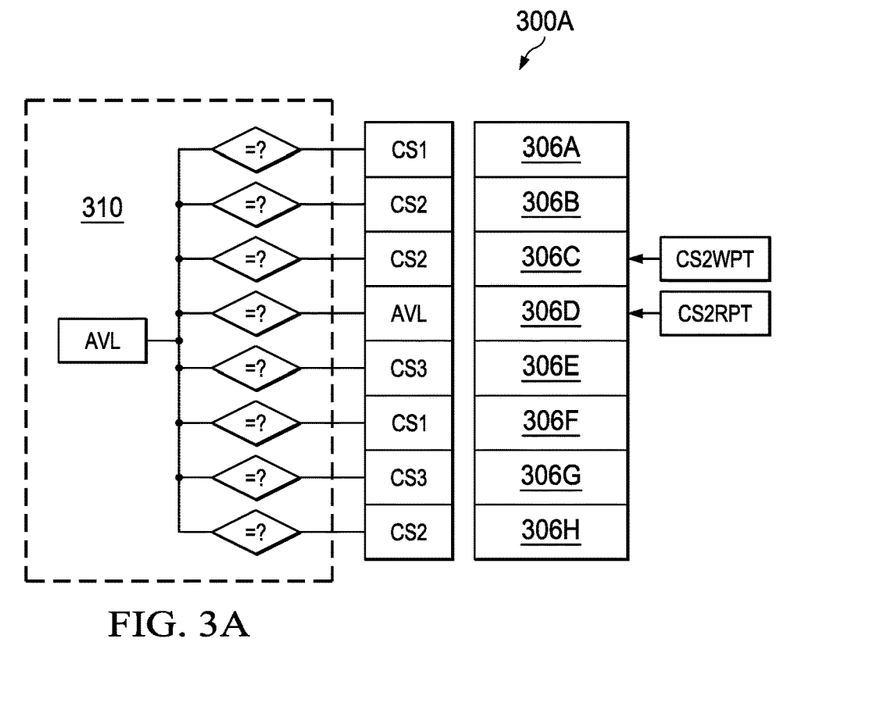
FIGS. 3A-E illustrates several write cycles associated with Endpoint CS2 according to an embodiment of the disclosure.

FIGS. 3A-E illustrates several cycles during which data needs to be written for Endpoint CS2. FIG. 3A illustrates FIFO Buffer 300A at a point in time as a period of bus time allotted to Endpoint CS2 has just ended. As can be seen, FIFO Buffer 300A contains data in Data Locations 306B, 306C and 306H for Endpoint CS2. FIFO Buffer 300A also contains data for Endpoint CS1 in Data Locations 306A and 306F and contains data for Endpoint CS3 in Data Locations 306E and 306G; Endpoint CS4 does not currently have data stored in FIFO Buffer 300A. Additionally, Tag Location 308D, which is associated with Data Location 306D, indicates that this location is available. The Write Pointer for CS2, i.e., CS2WPT, is pointing at location 306C, as this was the last location written on behalf of Endpoint CS2, and the Read Pointer for CS2, i.e., CS2RPT, is pointing at location 306D, the last location read.

Figure 3B:
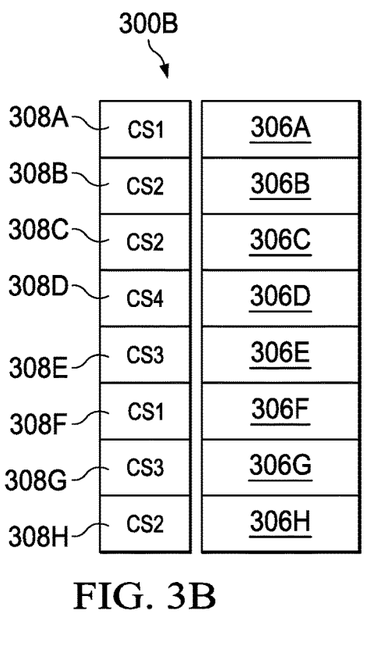

In an example situation, Endpoint CS4 is the next endpoint requesting access to the communication channel and to FIFO Buffer 300 and data needs to be written on behalf of Endpoint CS4. The first action to be performed is to use Comparator 310 to determine whether any locations are available in the buffer. Comparator 310 compares the tag that designates availability (AVL in this example) to each location in FIFO Buffer 300A and determines that Data Location 306D is available. Data is then written for Endpoint CS4, as shown in FIG. 3B, and the corresponding tag is set to CS4. It can be seen that at this point, FIFO Buffer 300B does not contain any available locations, so the status of FIFO Buffer 300B is set to full. Since no locations are available, all Endpoints also have a status of full.

Figure 3C:
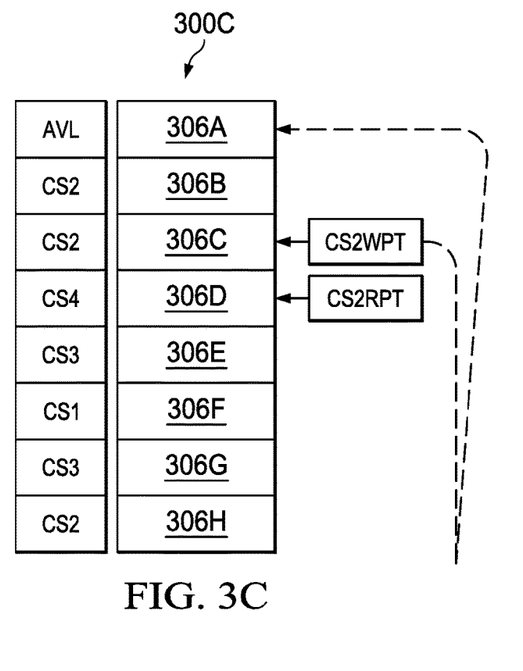

In the next time period, Endpoint CS1 has access to the FIFO buffer and a read is performed on behalf of this endpoint from Data Location 306A and this location is marked as available, as seen in FIG. 3C. Note that at this point, the status of FIFO Buffer 300C is no longer full, as there is an available location, but the status of Endpoint CS2 remains full. The sole location available would require moving write pointer from location 306C, where CS2WPT is pointing, past location 306D, where CS2RPT is pointing, to access available location 306A (path shown by dotted lines). Since this action is not allowed under the restrictions of this architecture, the status of CS2 remains full. The entity performing a write for Endpoint CS2 must wait for a read to occur on behalf of CS2 before further writing can be performed. Note that as shown here, such a condition can potentially persist through reads performed by other slaves.

Figure 3D:
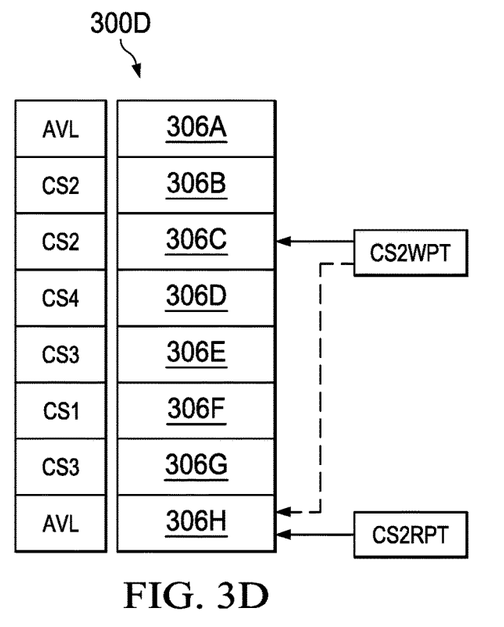
Figure 3E:
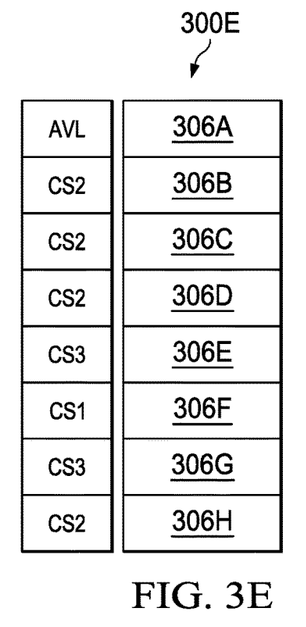

In a next time period, CS2 again has access to the FIFO buffer. A read on behalf of CS2 is performed, so after checking Comparator 310 for matches, CS2RPT is moved to Data Location 306H, the data stored therein is read, and Tag 308H is marked as available, as shown in FIG. 3D. This operation resolves the CS2 Full condition and if there is a subsequent write request for CS2 then Write Pointer CS2WPT can be moved from its current position (shown as a solid line) to point to the next available location (shown as a dotted line) without crossing over Read Pointer CS2RPT. Therefore, a location is available for data to be written on behalf of CS2. A write is performed into Data Location 306H, Tag 308H is updated to reflect CS2, and Write Pointer CS2WPT is updated; the result of this operation is shown in FIG. 3E. Note that Read Pointer CS2RPT cannot be updated further till the next read is performed on CS2 hence no further writes can be made on behalf of CS2 at this time, even though Data Location 306A is available, as write pointer crossing past read pointer is not allowed. However, in at least one embodiment, Read Pointer CS2RPT is defined as next location to be read after a current read operation is performed. In this embodiment, CS2RPT would point to Data Location 306B (not specifically shown) and available Data Location 306A would be accessible for writing on behalf of CS2. In either implementation the write pointer not crossing read pointer shall be followed.

Figure 4A:
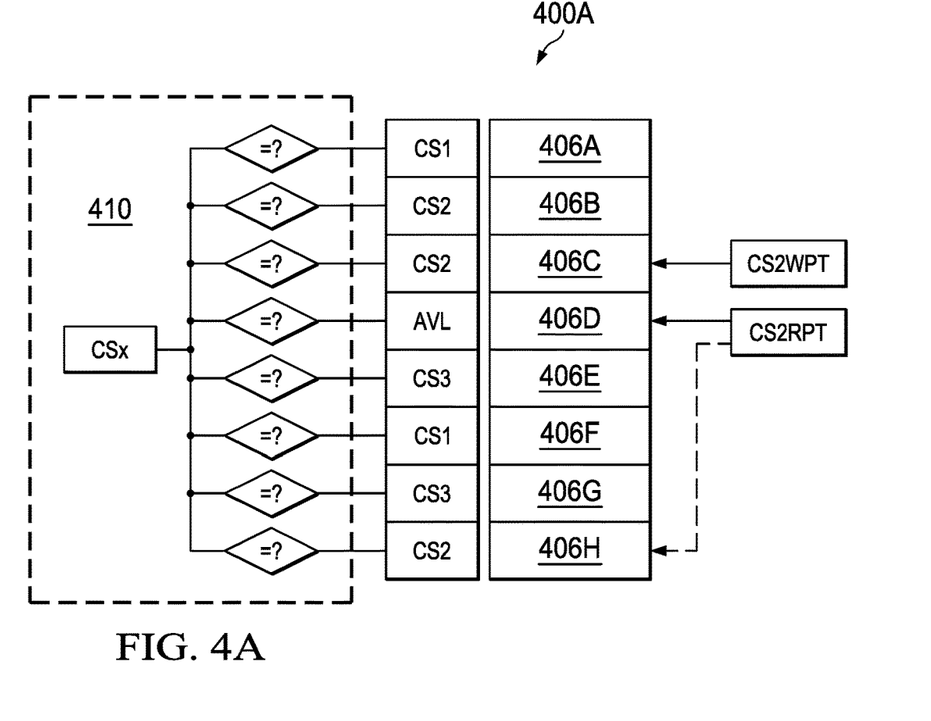
FIGS. 4A-E illustrates several read cycles associated with Endpoint CS2 according to an embodiment of the disclosure.
Figure 4B:
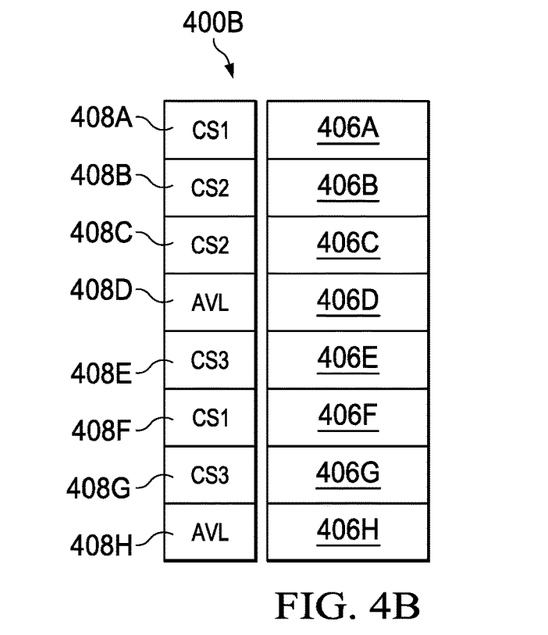

FIGS. 4A-E similarly illustrate several cycles during which data is available to be read for Endpoint CS2. FIG. 4A contains the same distribution of data as did FIG. 3A, with CS2 read access is requested for FIFO Buffer 400A. Comparator 410 is used to determine locations that contain data for Endpoint CS2. Once it is determined that the next location to be read is at Data Location 406H, Read Pointer CS2RPT is moved to point to this location, the data is read, and Tag 408H is updated to reflect that the location is available, as shown in FIFO Buffer 400B of FIG. 4B. In at least one alternate embodiment, Read Pointer CS2RPT was updated to point to Data Location 408H after the previous read step was performed. Then when it is time to perform a read on behalf of CS2, there is no need to search for the next location to be read. In this alternate embodiment, Data Location 406H is read, Tag 408H is updated to indicate availability, Comparator 410 is used to determine the next read location for CS2, and CS2RPT is incremented to the next read location, which in this example is Data Location 406B (not specifically shown). In at least one embodiment, a rollover flag (not specifically shown) is used, which tracks the disparity between roll-over of the write pointer versus the read pointer. Here, "roll-over" refers to a pointer passing the "bottom" of the buffer and moving to the "top". When the write pointer rolls-over, the rollover flag is set to indicate a wrap; when the read pointer rolls-over, the rollover flag is reset. The rollover flag can be used in determining the full or empty conditions.

Figure 4C:
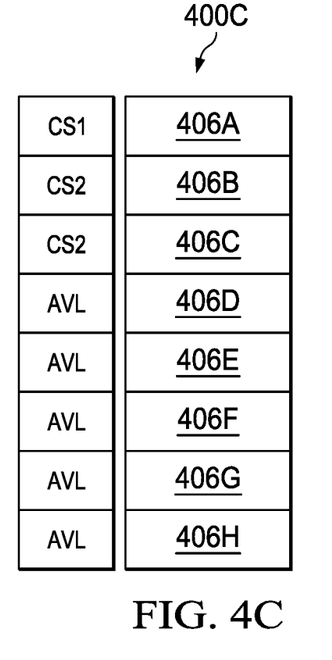
Figure 4D:
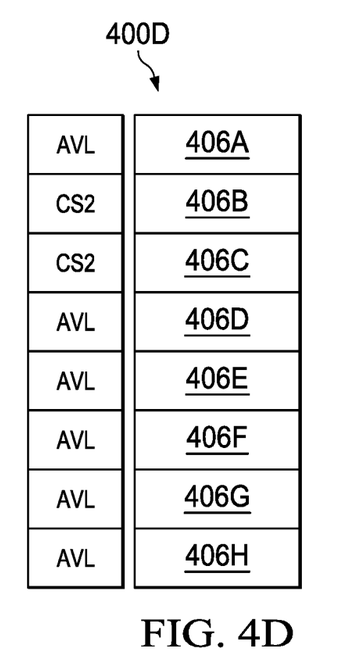
Figure 4E:
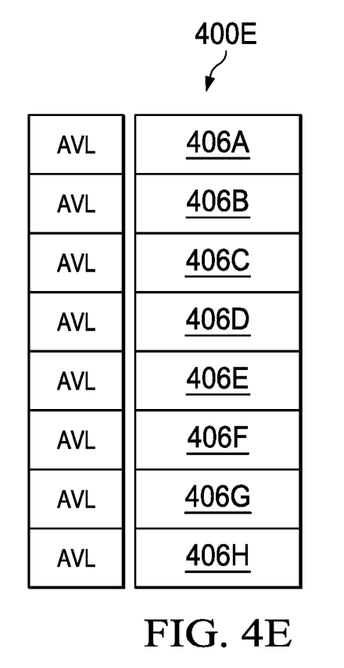
Figure 5A:
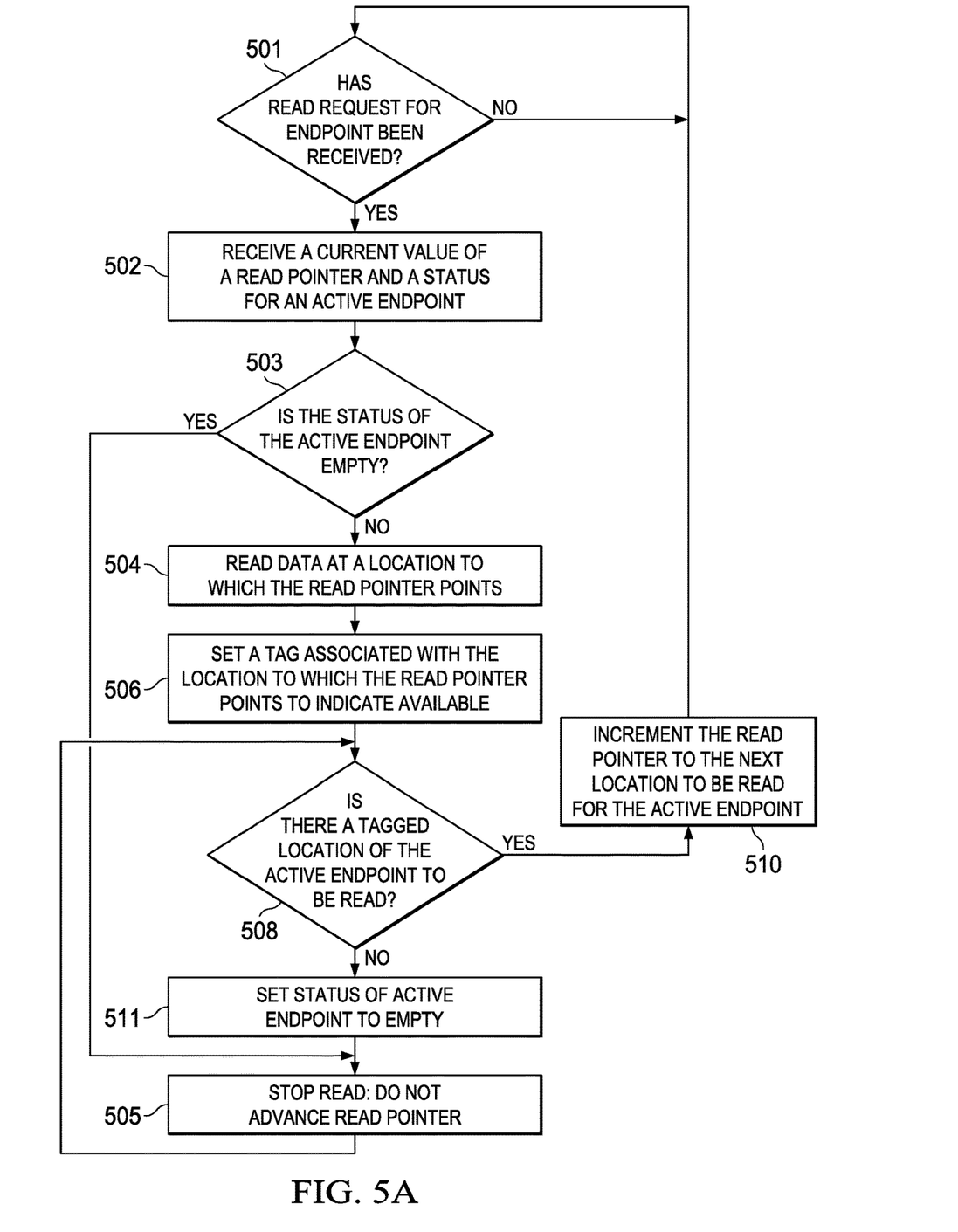
FIGS. 5A-D depicts portions of a method for operating a First In, First Out FIFO buffer according to an embodiment of the disclosure.
Figure 5B:
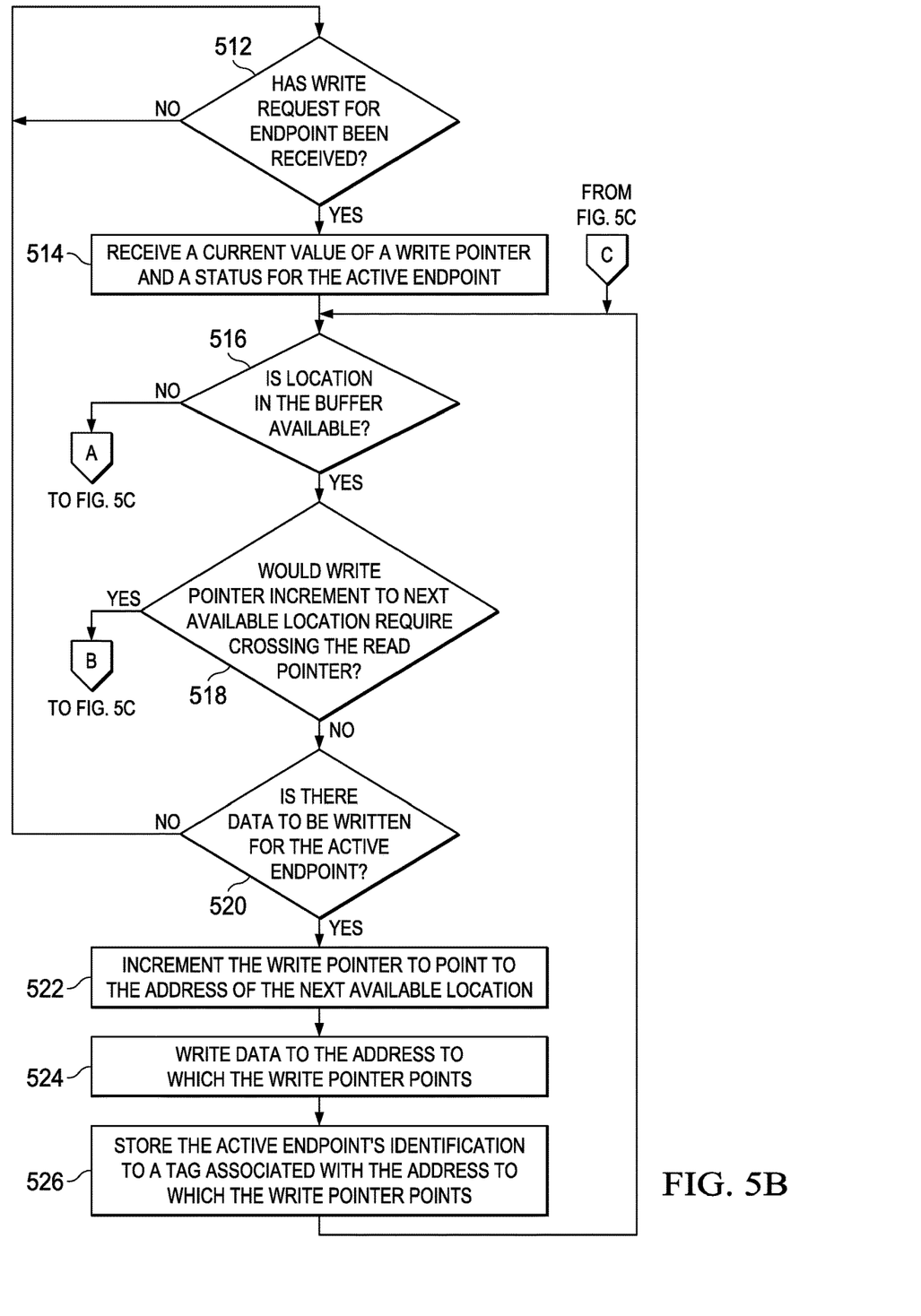
Figure 5C:
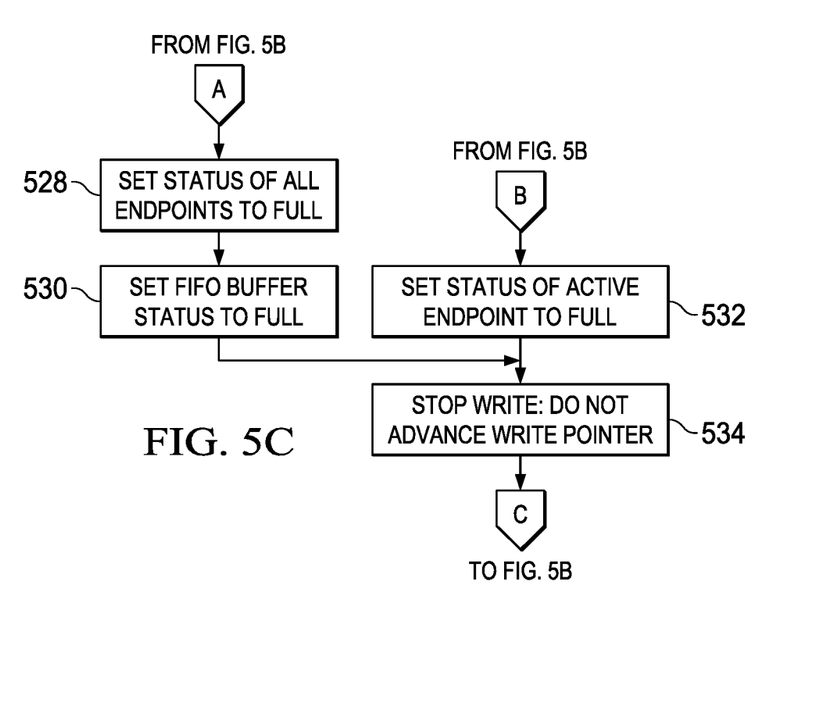
Figure 5D:
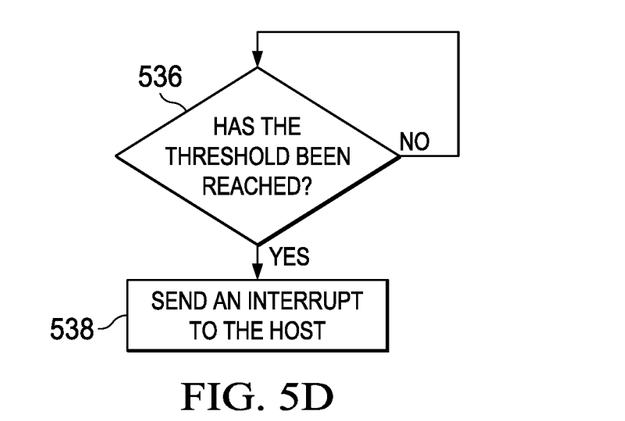

FIGS. 4C-E illustrate FIFO Buffer 400 in various stages of empty. In FIG. 4C, Endpoints CS1 and CS2 currently have data in the buffer. The status of Endpoints CS3 and CS4, which do not have data currently in FIFO Buffer 400C are set to empty. Note that a status of CSx empty simply indicates that no data is available for reading on behalf of CSx; no limit of "available' locations in FIFO Buffer 400C is implied. In FIG. 4D, the last location associated with Endpoint CS1 has been read from FIFO Buffer 400D; the status of each of Endpoints CS1, CS3 and CS4 is set to empty. Finally in FIG. 4E, the remaining data associated with CS2 is read; not only is the status of each of Endpoints CS1 CS2, CS3, CS4 set to empty, but the status of FIFO Buffer 400E is also set to empty. When the status of the buffer is set to empty, a burst of the size of the FIFO Buffer 400 can be transferred contiguously.

In at least one embodiment an optional "Threshold" value can be set for each endpoint. In at least one embodiment, this threshold is used to trigger the corresponding endpoint to transfer data of a number of locations equal to the threshold. In at least one embodiment, the threshold is used by endpoints to send an interrupt to the Host, indicating that the threshold number of locations can be either read or written by the host.

As noted earlier with regard to FIG. 2A, each endpoint has its own FIFO access register (CSx FIFO Register) and its own dedicated status register. As the host accesses each particular Endpoint CSx, the host manages data flow control using CSx FULL/EMPTY and FIFO FULL/EMPTY conditions and optionally using CSx thresholds. The host is expected to check the status (e.g., FULL/EMPTY) of the endpoints before performing any operation. If there is a wrong operation request, such as a Read when Empty or a Write when Full, the typical course of action is to not increment the respective pointer and to return the data pointed to by the read pointer or to overwrite existing write data. However, the course of action may vary based on specific implementations or applications. That is, in at least one embodiment, the write data is discarded rather than overwriting previous data and the read gives a fixed value.

With operations across endpoints interleaved, a status of empty/full is tracked per slave. However, for operations that guarantee data block contiguity for endpoints, a common status indicator can be used. In at least one embodiment, host flags, i.e., TX FIFO full and RX FIFO empty can be tracked for each slave. When line side accesses are strictly ordered with respect to host accesses, line side flags RX FIFO full and TX FIFO empty can be simplified by checking the absence or number of an "available" tag in FIFO.

The embodiments discussed thus far have used independent FIFO control for each endpoint. However, in at least one embodiment, the CSx FIFO Access Registers can be used without independent CSx write control but using only the tag update and tag matching logic. In this embodiment, CSx FIFO Registers do not need to contain a write pointer for each endpoint. Only a read pointer is used, as when writes are to be performed, the entity looks for the next available location without crossing read pointer for related endpoint. This common FIFO write pointer utilizes the FIFO buffer best for sequenced reads matching the write order. The disclosed method of using a common buffer and individual CSx registers has no implications on Line Side data flow control choice.

The disclosed FIFO embodiments can be applied both to Serial Communication peripherals, such as SPI, and to memory controllers for SDRAM, ASRAMs, Flash, etc. These embodiments may also provide ease for supporting multi-drop slave features in hardware and software, where complexity and size are often deterrents to support such features.

FIGS. 5A-D disclose portions of a flowchart for operating a First In, First Out FIFO buffer. In at least one embodiment, the flow begins with determining (501) whether a read request has been received for the endpoint. If none has been received, the flow will wait until a read request has been received. The method next receives (502) a current value of a read pointer and a status for an active endpoint. This may occur, for example, when the host accesses a particular endpoint. The method continues with determining (503) whether the active endpoint status is Empty and if the status is Empty, stops (505) the read by not advancing the read pointer. If the status is not Empty, the method continues by reading (504) data from a location to which the read pointer points and setting (506) a tag associated with the location to which the read pointer points to indicate availability. If the status is empty, the method stops (505) the read by not advancing the read pointer and updating an error status if provided The method then determines (508) whether there is a tagged location of the active endpoint for next read. If there is not a tagged location for the next read, the method sets (511) the status of the active endpoint to Empty and stops advancing (505) the read pointer until a write is performed for the endpoint. If, however, a next location is found, the read pointer is incremented (510) to the next location to be read for the active endpoint.

During the time that the endpoint is active, writing can also be occurring provided CSx full is not set. In at least one embodiment, the writing process determines (512) whether a write request with data has been received for the endpoint. Once a write request has been received, the method receives (514) a current value of a write pointer and a status for the active endpoint. The method determines (516) whether there is an available location in the buffer. If no available location exists at this time, the method sets (528) the status of all endpoints to FULL, sets (530) the FIFO buffer's status to full, and stops the write (534) by not advancing the write pointer and by setting an error status if provided. If there is an available location, the method determines (518) whether incrementing the write pointer to an address of a next available location would require crossing the address to which the read pointer points. If incrementing the write pointer would do so, the method sets (532) the status for the active endpoint to full and stops (534) the write by not advancing write pointer and setting an error status if provided. If incrementing the write pointer would not cross the location to which the read pointer points, the method determines (520) whether there is data to be written for the active endpoint. If there is not data to be written, the method returns to wait (512) for the next write request. If there is data to be written, then the method increments (522) the write pointer to point to the address of the next available location. The method then writes (524) data to the address to which the write pointer points and stores (526) the active endpoint's identification to a tag associated with the address to which the write pointer points. After updating the active endpoint's identification to the tag of a written location the method determines (516) whether there is an available location for the next write. If there is no available location for the write pointer to advance without crossing the read pointer, the method sets (532) the status of the active endpoint to full. When there are no available locations at all in the FIFO, then the status of all active endpoints are set (528) to Full and the status of the FIFO buffer is set (530) to Full.

In at least one embodiment the Full and Empty checks for each endpoint are continuous checks regardless of which endpoint is active, as available locations are shared resources; depending upon the read and write pointers' positions with respect to available locations, the CSx Full and Empty Flags could change even if the corresponding endpoint had no read or write operation.

In at least one embodiment, a threshold is also available for each endpoint. The host is expected to program the threshold associated with a respective endpoint. The threshold may indicate, for example, that when Endpoint X has written data to "Z" locations, the server should receive an interrupt to read the buffer for Endpoint X. The method determines (536) whether the threshold has been reached. If not, the method will continue to check periodically. When the threshold is reached, an interrupt is sent (538) to the host.

Advantages of the disclosed embodiments can include one or more of the following:

The depth of the FIFO buffer is dependent on the rate of host access and on slave side speed. The margin for host delays and protocol overheads on the slave side can be commonly built across slaves to optimize FIFO size.

The size of a FIFO buffer for managing N endpoints can be much less than N times the space required to match data rates without impacting performance—in at least one embodiment, the area for a FIFO buffer was reduced by almost one half for four or more slaves;

The system host can implement access to multiple endpoints without requiring the overhead to track transaction completion of the endpoints;

The software programming to access different endpoints is much less complicated;

Overhead is reduced to set different endpoint settings at transaction boundaries;

When used with a common-data-rate, strictly ordered operation, common FIFO control simplifies both software and hardware implementation;

Operation is possible across hosts and endpoints without loss of data integrity; and Different data-rate hosts and endpoints can operate together without needing multiple FIFO buffers.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a non-transitory tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

Still further, in at least some additional or alternative implementations, the functions/acts described in the blocks may occur out of the order shown in the flowcharts. For example, two blocks shown in succession may be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be understood that the order or sequence of the acts, steps, functions, components or blocks illustrated in any of the flowcharts depicted in the drawing Figures of the present disclosure may be modified, altered, replaced, customized or otherwise rearranged within a particular flowchart or block diagram, including deletion or omission of a particular act, step, function, component or block. Moreover, the acts, steps, functions, components or blocks illustrated in a particular flowchart may be intermixed or otherwise inter-arranged or rearranged with the acts, steps, functions, components or blocks illustrated in another flowchart and/or block diagram in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method comprising:
receiving a current value of a read pointer indicating an address of a data location in a shared data buffer and a status for an active endpoint that is one of a plurality of endpoints configured to read data from and write data to data locations in the shared data buffer; and
reading data from the shared data buffer at the data location to which the read pointer points and setting a tag that is associated with the data location to which the read pointer points to indicate availability, the tag being one of a plurality of tags each associated with a particular data location in the shared data buffer, the shared data buffer being a circular data buffer configured to store data associated with differing endpoints at consecutive or at interleaved data locations, the tags indicating that the associated data location is available or is associated with a particular endpoint;
receiving a current value of a write pointer for the active endpoint;
determining whether a data location in the shared data buffer arranged to transfer data between a host configured to read data from and write data to the endpoints is available;
responsive to determining that a data location is available in the shared data buffer, determining whether incrementing the write pointer to an address of a next available data location for the active endpoint in the shared data buffer would require crossing an address to which the read pointer for the active endpoint currently points; and
responsive to determining that incrementing the write for the active endpoint would require crossing the address to which the read pointer for the active endpoint currently points, retaining the current value for the write pointer of the active endpoint.

2. The method as recited in claim 1, further comprising, prior to reading the data, determining whether the status for the active endpoint is empty and stopping the read if the status for the active endpoint is empty.

3. The method as recited in claim 1, further comprising:
determining whether there is a next data location in the shared data buffer to be read for the active endpoint; and
responsive to determining that there is a next location to be read, incrementing the read pointer to the address of the next data location in the shared data buffer to be read for the active endpoint.

4. The method as recited in claim 3, further comprising using a comparator to determine whether the tags of the data locations of the shared data buffer contains one or more tags that match the active endpoint.

5. The method as recited in claim 3, further comprising:
responsive to determining that there is not a next location to be read for the active endpoint, setting the status of the active endpoint to empty;
responsive to determining the status of the active endpoint is empty, determining whether all the plurality of endpoints are empty and all tags associated with data locations in the shared data buffer are indicating available; and
responsive to determining that all endpoints are empty and all tags in the shared data buffer are indicating available, setting the status of the shared data buffer to empty.

6. The method as recited in claim 1, further comprising:
responsive to determining that incrementing the write pointer to the address of the next available data location in the shared data buffer would not require crossing the address to which the read pointer points, determining whether there is data to be written for the active endpoint; and
responsive to determining that there is data to be written for the active endpoint, incrementing the write pointer to point to an address of the next available data location in the shared data buffer for the active endpoint.

7. The method as recited in claim 6, further comprising:
writing data to the data location at the address to which the write pointer points; and
storing an identifying value of the active endpoint to a tag associated with the address of the data location in the shared data buffer to which the write pointer points.

8. The method as recited in claim 1, further comprising, responsive to determining that incrementing the write pointer to the address of the next available location for the active endpoint would require crossing the address to which the read pointer for the active endpoint points, setting the status for the active endpoint to full.

9. The method as recited in claim 1, further comprising, responsive to determining that no data locations are available, setting the status of the shared data buffer to full.

10. The method as recited in claim 1, further comprising using a comparator coupled to the shared data buffer to determine that one or more tags of the locations in the shared data buffer that match the active endpoint.

11. The method as recited in claim 6, further comprising:
receiving a threshold value set by the host for a number of written locations for the active endpoint before trigger;
determining whether the number of written locations for the active endpoint reaches the threshold value; and
responsive to determining that the number of written locations for an active endpoint reaches the threshold value, triggering an interrupt to the host.

12. The method as recited in claim 3, further comprising:
receiving the threshold value set by the host for a number of pending read locations for an active endpoint before a trigger;
determining whether the number of pending reads reaches the threshold value;
responsive to determining that the number of pending reads reaches the threshold value, triggering an interrupt to the host.

13. The method as recited in claim 1, wherein a host configured to read data from and write data to the plurality of endpoints is configured to access each of the plurality of endpoints with line side operations in succession in accordance with a rule that any write pointer for an endpoint is not to cross any read pointer for that same endpoint.

14. A system comprising:
a shared data buffer configured to provide for data transfer in a first direction, wherein each entry in the shared data buffer includes a data location and a tag location, wherein the tag location is configurable to indicate a designation of available or an identifier for a respective endpoint from a plurality of endpoints coupled to read data from and write data to the shared data buffer; and
registers associated with respective endpoints of the plurality of endpoints, the registers including an access register for read or write triggering a corresponding operation to the shared data buffer, the shared data buffer being a circular data buffer configured to store data associated with endpoints at consecutive or at interleaved data locations;
the system configured to determine, in response to a write operation triggered by a write to the access register, whether a data location in the shared data buffer is available and when a data location in the shared data buffer is available, further configured to determine whether incrementing the value of a write pointer pointing to a location in the shared data buffer associated with an active endpoint would require crossing a value of a read pointer pointing to a location in the shared data buffer associated with the active endpoint, and responsive to the determining that incrementing the value of a write pointer pointing to a location in the shared data buffer associated with an active endpoint would require crossing a value of a read pointer, setting a status flag for the active endpoint to full.

15. The system as recited in claim 14, wherein the registers include a status register, a read pointer, and a write pointer.

16. The system as recited in claim 14, further comprising a comparator connected to the buffer and configured to determine whether the buffer contains a tag that matches a given value.

17. The system as recited in claim 14, further comprising a status indicator for the buffer, the status indicator operable to provide a status of full and a status of empty.

18. The system as recited in claim 14, wherein the registers further include respective thresholds per endpoint and a mechanism to trigger an interrupt to a host upon respective operations crossing the threshold number of locations in buffer.

19. A non-transitory computer-readable medium having a sequence of program instructions which, when executed by a processor, perform a method of operating a first-in-first-out (FIFO) buffer arranged to transfer data between a master device and a plurality of endpoints using chip select signaling by:
receiving a current value of a read pointer indicating an address of a data location in a shared data buffer and a status for an active endpoint that is one of a plurality of endpoints configured to read data from and write data to data locations in the shared data buffer;

reading data from the shared data buffer at a location to which the address in the read pointer points and setting a tag associated with the location to which the read pointer points to indicate availability, the tag being one of a plurality of tags each associated with a particular data location in the shared data buffer, the shared data buffer being a circular data buffer configured to store data associated with differing endpoints at consecutive or interleaved data locations, the tags indicating that the associated data location is available or is associated with a particular endpoint;

receiving a current value of a write pointer for the active endpoint;

determining whether a data location in the shared data buffer arranged to transfer data between a host configured to read data from and write data to the endpoints and the active endpoint is available;

responsive to determining that a data location is available in the shared data buffer, determining whether incrementing the write pointer to an address of a next available data location for the active endpoint in the shared data buffer would require crossing an address to which the read pointer for the active endpoint points; and responsive to determining that incrementing the write pointer to the address of the next available location for the active endpoint would require crossing the address to which the read pointer for the active endpoint points, setting a status flag for the active endpoint to full and retaining the value of the write pointer for the active endpoint.

\* \* \* \* \*